United States Patent
Martinez

(10) Patent No.: US 6,479,936 B1
(45) Date of Patent: Nov. 12, 2002

(54) AFTERGLOW LAMP WITH MULTIPLE PHOSPHOR COATINGS

(76) Inventor: Jorge Matarrodona Martinez, C 1. Casanova, 199, 40 22, 08036 Barcelona (ES)

( * ) Notice: Subject to any disclaimer, the term of this patent is extended or adjusted under 35 U.S.C. 154(b) by 0 days.

(21) Appl. No.: 09/530,761

(22) PCT Filed: Oct. 27, 1998

(86) PCT No.: PCT/ES98/00291

§ 371 (c)(1), (2), (4) Date: Apr. 28, 2000

(87) PCT Pub. No.: WO99/23414

PCT Pub. Date: May 14, 1999

(30) Foreign Application Priority Data

Oct. 31, 1997 (ES) ............................................. 9702821

(51) Int. Cl.[7] .................................................. H01J 1/62
(52) U.S. Cl. ...................... 313/635; 313/487; 313/486; 313/485
(58) Field of Search ................................. 313/635, 487, 313/485, 486; 252/301.4 R, 301.6 R

(56) References Cited

U.S. PATENT DOCUMENTS

| | | |
|---|---|---|
| 4,245,282 A | 1/1981 | Ninguno |
| 4,420,898 A | 12/1983 | Ninguno |
| 4,481,560 A | 11/1984 | Ninguno |
| 4,546,416 A | 10/1985 | Ninguno |
| 5,838,101 A * | 11/1998 | Pappalardo ................. 313/487 |

FOREIGN PATENT DOCUMENTS

| | | |
|---|---|---|
| EP | 522785 A | 1/1993 |
| EP | 856871 A | 8/1998 |
| GB | 2301372 A | 12/1996 |

* cited by examiner

Primary Examiner—Vip Patel
Assistant Examiner—Ken A Berck
(74) Attorney, Agent, or Firm—Lackenbach Siegel, LLP

(57) ABSTRACT

Improved lamp of the type comprising the crystal bulb of an incandescent lamp or the crystal tube of a fluorescent lamp or preferably of the type comprised of a tube-shaped fluorescent lamp, characterized in that the structure of the tube itself forms a support for a luminescent product arranged as a coating which captures the light proceeding from a source and generated by the lamp itself thereby enabling it to emit its own light after the excitation has stopped thereby providing a self-contained lighting element.

3 Claims, 1 Drawing Sheet

AFTERGLOW LAMP WITH MULTIPLE PHOSPHOR COATINGS

OBJECT OF THE INVENTION

The object of the present patent application is an improved lamp which, in addition to the function for which it was designed, contributes a number of advantages that shall be set out hereinafter, besides others inherent in the arrangement and construction thereof

BACKGROUND OF THE INVENTION

The problem that arises when there is a power cut in a lighting installation, whether on business premises and within dwelling units, or outdoors, is well-known.

The current approach to solve this problem involves installing battery-powered emergency lamps. However, this solution provides isolated light spots which fail to define paths for people to find their way, which hampers their movement, particularly when in major stores or on business premises which have complex subdivisions.

Another drawback of the current technique is the high cost of the so-called emergency lamps, specifically devised for such purpose, and their accessories, rechargeable batteries, etc.

DESCRIPTION OF THE INVENTION

The applicant filing the present patent application has devised an improved lamp, based on a generic type lamp, preferably a fluorescent tubular lamp, using the tube as the element supporting a luminescent type product, preferably strontium aluminate $SrAl_2O_4$:EuDy and others, capable of capturing light coming from a source and emitting it when the source of excitation stops working.

It follows from the foregoing that upon treating the surface of a lamp, whether it be the glass bulb of an incandescent lamp or the glass tube of a fluorescent lamp, a luminescent spot or line will result which, a long with all the other lamps on the business premises, shall provide broken lines defining paths to be followed by people in the event of a power cut, lasting for between five and sixty minutes, say thirty minutes for instance.

The advantages over the currently known technique, summarily described in the preceding section, are self-evident, not only because of its effectiveness, but moreover because of the outstanding savings this entails, for the lamps lighting the business premises will actually serve as emergency lamps in the event of a power cut.

In order to complete the description made hereinafter and for an easier understanding of its characteristics, attached to this specification is a set of drawings whose figures show the most significant details of the invention for illustrative and non-limiting purposes.

DESCRIPTION OF A PREFERRED EMBODIMENT

With reference to the above figures and in accordance with the references numerals used, the same can be seen to show a preferred embodiment, which does not limit the invention, consisting of a fluorescent tube -1- being the element supporting a luminescent product -2-, which is preferably strontium aluminate $SrAl_2O_4$:EuDy and ZnS in a layer-like arrangement.

Figure 1:
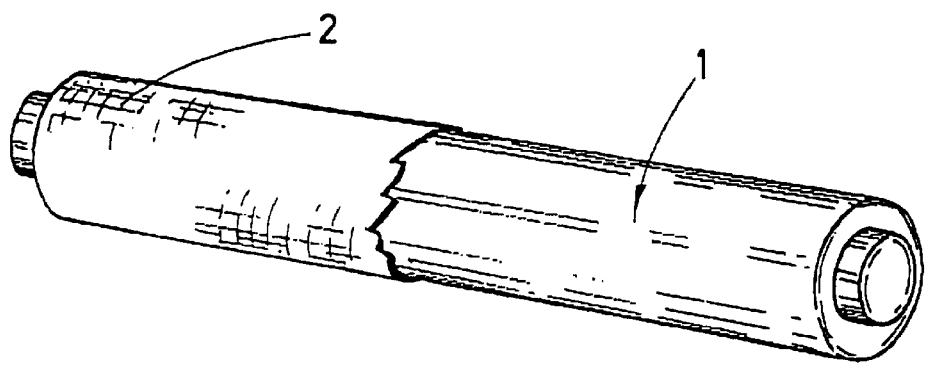
FIG. 1 is a perspective view of a fluorescent tubular lamp, provided with the improvement subject of the present invention.
Figure 2:
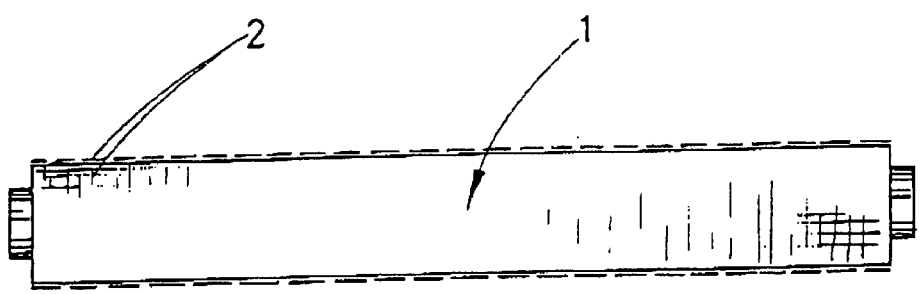
FIGS. 2 and 3 each are schematic views of a fluorescent tubular lamp, provided with the improvement subject of the invention, differing from each other only in the surface supporting the luminescent product.
Figure 3:
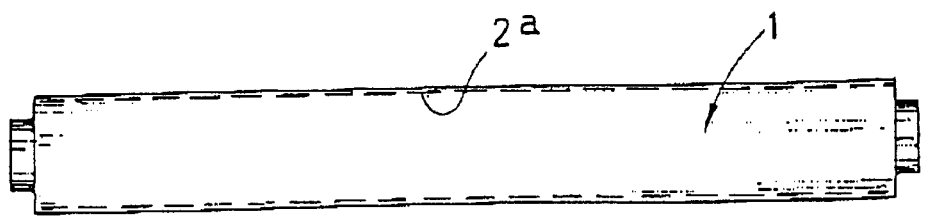

This product -2- may be applied on the outer surface of the tube -1-, as shown in FIGS. 1 and 2, or on the inner surface of said tube -1-, as in 2a, to which end, in the case of fluorescent lamps, a second inner triphosphorous coating, for instance $(SrCaBaMg)_5(PO_4)Cl$:Eu, shall be provided, which is not provided in all other types of lamps, the latter being also protected in the present invention.

The luminescent product -2-2a- is capable of capturing the light coming from the tube -1- proper when it is switched on, and emitting its own light when the tube -1- is switched off for whatever reason.

A first objective of the invention is to obtain a low-cost self-powered emergency lamp.

A second objective of the invention is to obtain an emergency lighting which is equal in number to the lamps lighting the business premises or store, in order to form light lines for people to find their way in the darkness.

What is claimed is:

1. A lamp, having a light source and a glass support formed as a bulb of an incandescent lamp or as a glass tube of a fluorescent lamp, said glass support being coated by a first layer of a luminescent product having pigments of $SrAl_2O_4$:EuDy and ZnS which in turn is coated by a second layer of a luminescent product comprising $(SrCaBaMg)_5(PO_4)_3Cl$:Eu.

2. The lamp of claim 1 wherein the luminescent products are coated on the inner surface of the glass support.

3. The lamp of claim 1 or 2, having a excitation time of the luminescent product not exceeding ten minutes and an emission time exceeding sixty minutes.

* * * * *